(12) United States Patent
Bisht

(10) Patent No.: US 9,892,227 B1
(45) Date of Patent: Feb. 13, 2018

(54) SYSTEMS, METHODS AND STORAGE MEDIA FOR CLOCK TREE POWER ESTIMATION AT REGISTER TRANSFER LEVEL

(71) Applicant: SAS IP, Inc., Cheyenne, WY (US)

(72) Inventor: Ajay Singh Bisht, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 19 days.

(21) Appl. No.: 14/926,619

(22) Filed: Oct. 29, 2015

Related U.S. Application Data

(60) Provisional application No. 62/069,899, filed on Oct. 29, 2014.

(51) Int. Cl.
*G06F 17/50* (2006.01)
(52) U.S. Cl.
CPC .................. *G06F 17/5081* (2013.01)
(58) Field of Classification Search
CPC ............. G06F 2217/78; G06F 17/5009; G06F 2217/82; G06F 2217/84; G06F 1/3237

USPC .................. 716/108–109, 113–114, 133–137
See application file for complete search history.

(56) References Cited

U.S. PATENT DOCUMENTS

| | | | |
|---|---|---|---|
| 8,966,425 B1 * | 2/2015 | Eisenstadt ........... | G06F 17/5077 716/120 |
| 9,135,375 B1 * | 9/2015 | Sood ....................... | G06F 17/50 |
| 2004/0019859 A1 * | 1/2004 | Ravi .................... | G06F 17/5022 716/103 |
| 2006/0053395 A1 * | 3/2006 | Lai ............................ | G06F 1/10 716/114 |
| 2013/0194016 A1 * | 8/2013 | Wimer ............... | H03K 19/0016 327/199 |

* cited by examiner

*Primary Examiner* — Nghia Doan
(74) *Attorney, Agent, or Firm* — Jones Day

(57) ABSTRACT

Systems, methods and storage media are provided for clock tree power estimation at register transfer level. For example, a physical power model is generated based at least in part on a reference post-layout design. A clock tree is modeled at register transfer level based at least in part on the physical power model. Power estimation is performed for the modeled clock tree at the register transfer level.

20 Claims, 12 Drawing Sheets

SYSTEMS, METHODS AND STORAGE MEDIA FOR CLOCK TREE POWER ESTIMATION AT REGISTER TRANSFER LEVEL

CROSS REFERENCE TO RELATED APPLICATIONS

This application claims priority to U.S. Patent Application No. 62/069,899, filed Oct. 29, 2014, the entirety of which is herein incorporated by reference.

TECHNICAL FIELD

The present disclosure relates generally to computer-aided design (CAD) tools for power estimation, and, more specifically, to systems, methods, and storage media for clock tree power estimation at register transfer level of design abstraction.

BACKGROUND

FIG. 1 depicts an example flow chart for integrated circuit (IC) design. As shown in FIG. 1, electronic system level (ESL) design 12 may be performed based on certain system specification/requirements 10 for a digital IC. Register-transfer-level (RTL) design 14 models the digital IC in terms of a flow of digital signals (data) between hardware registers, and logical operations performed on those digital signals. A logic synthesis process 16 turns an abstract form of desired circuit behavior at RTL into a design implementation in terms of logic gates. During a physical design process 18, circuit representations of components (e.g., devices and interconnects) of a circuit design are converted into an IC layout (e.g., geometric representations of shapes which, when manufactured in corresponding layers of materials, can ensure required functioning of the components).

The physical design process 18 usually includes several stages, such as partitioning 24 (e.g., dividing a chip into small blocks), floor planning 26 (e.g., identifying structures that should be placed close together and allocating space for the structures in such a manner as to meet goals of available space, required performance, etc.), placement 28 (e.g., assigning exact locations for various circuit components within the chip's core area), clock tree synthesis (CTS) 30 (e.g., insertion of buffers or inverters along clock paths of the design to achieve zero/minimum skew or balanced skew), routing 32 (e.g., including global routing that allocates routing resources for connections, and detailed routing that assigns routes to specific metal layers and routing tracks within the global routing resources), and timing closure 34 (e.g., modifying the design to meet timing requirements). After the physical design process 18, physical verification and sign-off 20 may be performed to determine a correct layout design for manufacturing the chip 22.

Power consumption has become important along with timing and area for integrated circuit design (e.g., for portable, battery-powered electronic devices and high performance servers). There are a number of known power management techniques, but the challenge in designing for low power consumption is usually related to the accuracy of power estimation tools. Accuracy of power estimation is generally good at later stages of circuit design (e.g., after the placement stage 28 and the routing stage 32 are completed), but then it may be too late to make architectural changes to the circuit design for reducing power consumption.

Power estimation at the RTL stage 14 can be more efficient for optimizing power consumption because at the RTL stage 14 there is enough flexibility to make high-impact changes to achieve low power consumption. However, power estimation at the RTL stage 14 may not be very accurate, as it is often difficult to evaluate the impact of the design changes on power consumption without going through the placement 28, the CTS stage 30, and the routing 32. Power estimation at the RTL stage 14 may also suffers accuracy loss because at the RTL stage 14, there is no or little knowledge of design structure and dynamic effects (e.g., glitches and poor modeling of clock and interconnect structures).

For example, design changes of clocks may be made at the RTL stage 14 for power reduction because clocks are the largest source of dynamic power consumption. Such changes at the RTL stage 14 to reduce clock power can affect physical characteristics of a clock tree structure. The clock tree structure, however, is built during the CTS stage 30 that is performed after the placement stage 28 is completed, as shown in FIG. 1. Thus, it is not easy to estimate accurately the impact of any design changes at the RTL stage 14 on clock power reduction.

Therefore, methods and systems to model and accurately estimate clock power at the RTL stage are needed.

SUMMARY

In accordance with certain embodiments, systems, methods and storage media are provided for clock tree power estimation at register transfer level. For example, a physical power model is generated based at least in part on a reference post-layout design. A clock tree is modeled at register transfer level based at least in part on the physical power model. Power estimation is performed for the modeled clock tree at the register transfer level.

As an example, a processor-implemented system for clock tree power estimation at register transfer level includes: one or more data processors; and one or more non-transitory computer-readable storage media encoded with instructions for commanding the one or more data processors to execute certain operations. For example, a physical power model is generated based at least in part on a reference post-layout design. A clock tree is modeled at register transfer level based at least in part on the physical power model. Power estimation is performed for the modeled clock tree at the register transfer level.

As another example, a non-transitory machine-readable storage medium encoded with instructions is provided for commanding one or more data processors to execute operations of a method for clock tree power estimation at register transfer level. For example, a physical power model is generated based at least in part on a reference post-layout design. A clock tree is modeled at register transfer level based at least in part on the physical power model. Power estimation is performed for the modeled clock tree at the register transfer level.

DETAILED DESCRIPTION

Figure 1:
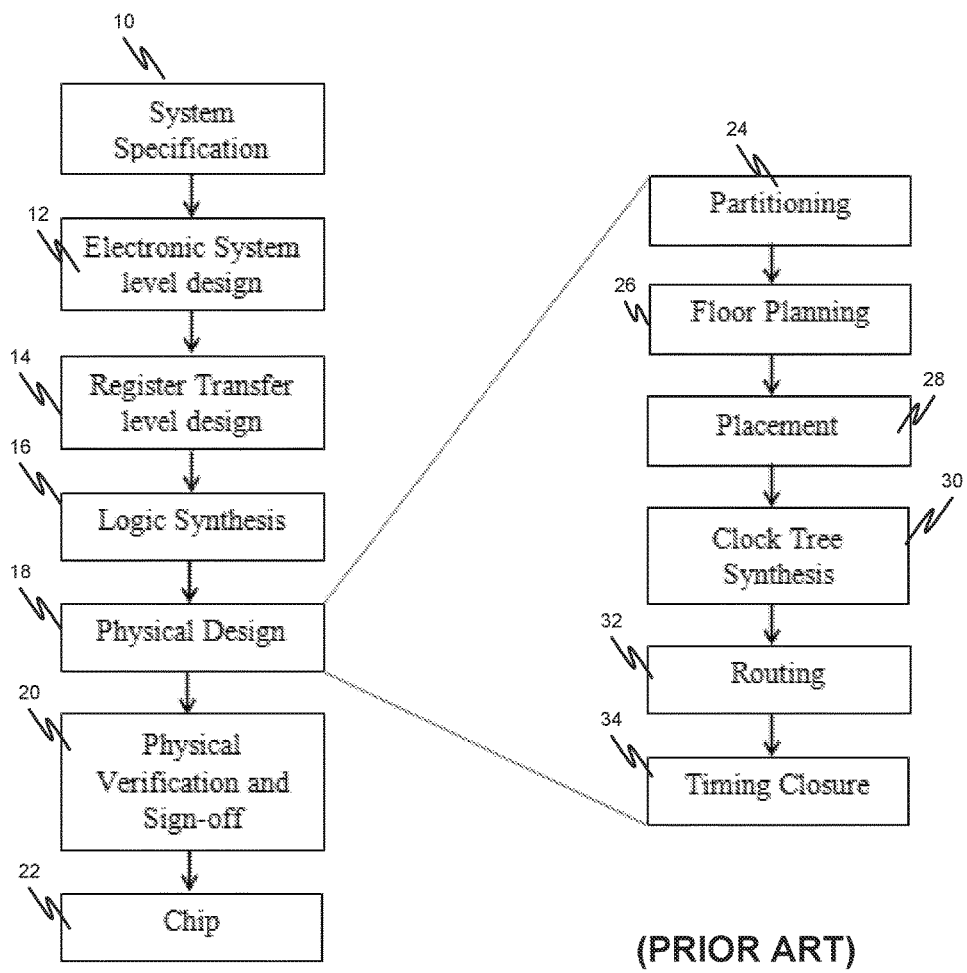
FIG. 1 depicts an example flow chart for integrated circuit (IC) design.

As shown in FIG. 1, a clock may be built at the CTS stage 30 for delivering a clock signal to a large number of flip-flops, latches, memories and other clocked devices that carry out logic or data storage operations (e.g., only in response to edges of received clock signals). For example, a flip-flop stores input data only in response to an edge (e.g., a rising edge or a falling edge) of the clock signal. A latch is transparent only at a particular level (e.g., logic high or logic low) of the clock signal.

At the RTL stage 14 (and also until the placement stage 28), a clock net may drive a very large number of clocked devices. In the physical world, it is infeasible for a clock driver to drive that many loads. Hierarchies of buffers are added at the CTS stage 30 to fan out the clock from its source to the clock pins of certain sinks. For example, apart from balancing the load, a CTS tool may ensure that the clock signal reaches at the same time to the functionally related clock sinks (i.e., Skew). Otherwise, the IC may not function properly. A traditional top-down binary tree method of building clocks at RTL may be unpredictable and not working in case of high-speed processor designs.

Figure 2:
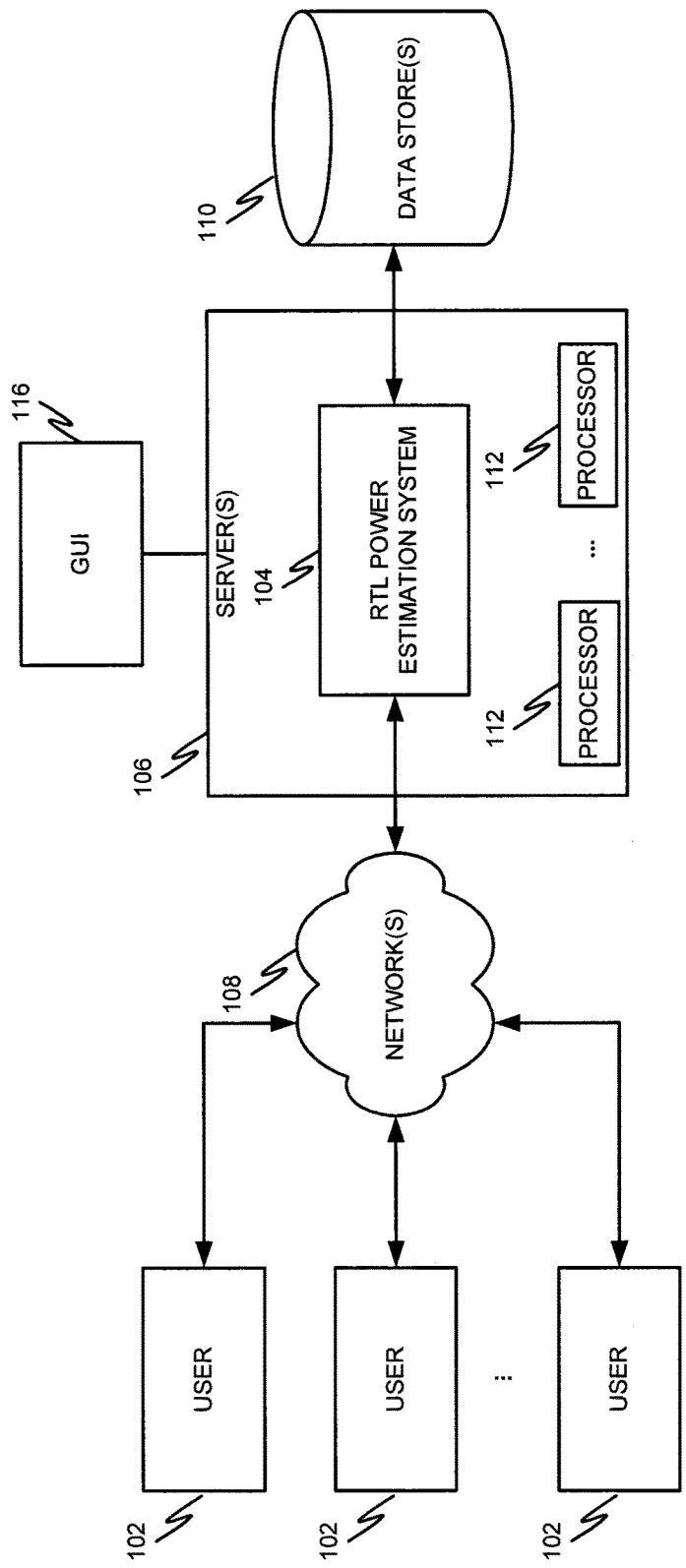
FIG. 2 depicts an example computer-implemented environment wherein users can interact with a clock tree power estimation system hosted on one or more servers through a network.

FIG. 2 depicts an example computer-implemented environment wherein users 102 can interact with a clock tree power estimation system 104 hosted on one or more servers 106 through a network 108. The clock tree power estimation system 104 can assist the users 102 for accurately predicting system power (e.g., at RTL). Specifically, the clock tree power estimation system 104 constructs a virtual clock tree at RTL with predictable power accuracy. In some embodiments, the clock tree power estimation system 104 builds the clock tree at RTL using a physical power model constructed from a reference post-CTS design. The physical power model contains topological information and electrical characteristics determined based on the reference post-CTS design.

As shown in FIG. 2, the users 102 can interact with the clock tree power estimation system 104 through a number of ways, such as over one or more networks 108. The clock tree power estimation system 104 may assists one or more of the users 102 to construct a physical power model from a reference post-CTS design through a graphical user interface 116. One or more servers 106 accessible through the networks 108 can host the clock tree power estimation system 104. The one or more servers 106 implement one or more data processors 112. For example, the data processors 112 can be configured for parallel computing. The one or more servers 106 can also contain or have access to one or more data stores 110 for storing input data and/or output data for the clock tree power estimation system 104.

In certain embodiments, the clock tree power estimation system 104 builds a physical power model and uses the physical power model at RTL for power estimation (e.g., for high-speed processor designs that involve hybrid-clock networks, such as a combination of clock mesh and balanced clock trees). For example, the clock tree power estimation system 104 implements the physical power model to provide interconnect, transition time, area, topology and cell selection guidance to build the clock tree using a bottom-up approach that involves balancing clock paths through buffer or inverter insertion and timing optimizations (e.g., through gate-sizing and clock net splitting).

Specifically, a characterization process from a reference design is carried out to generate one or more physical power models, and then the physical power models can be applied to multiple RTL designs. For example, the reference design can be an older version of a current reference design. As another example, the reference design may be of a similar design style as the current reference design at a same technology node.

Figure 3:
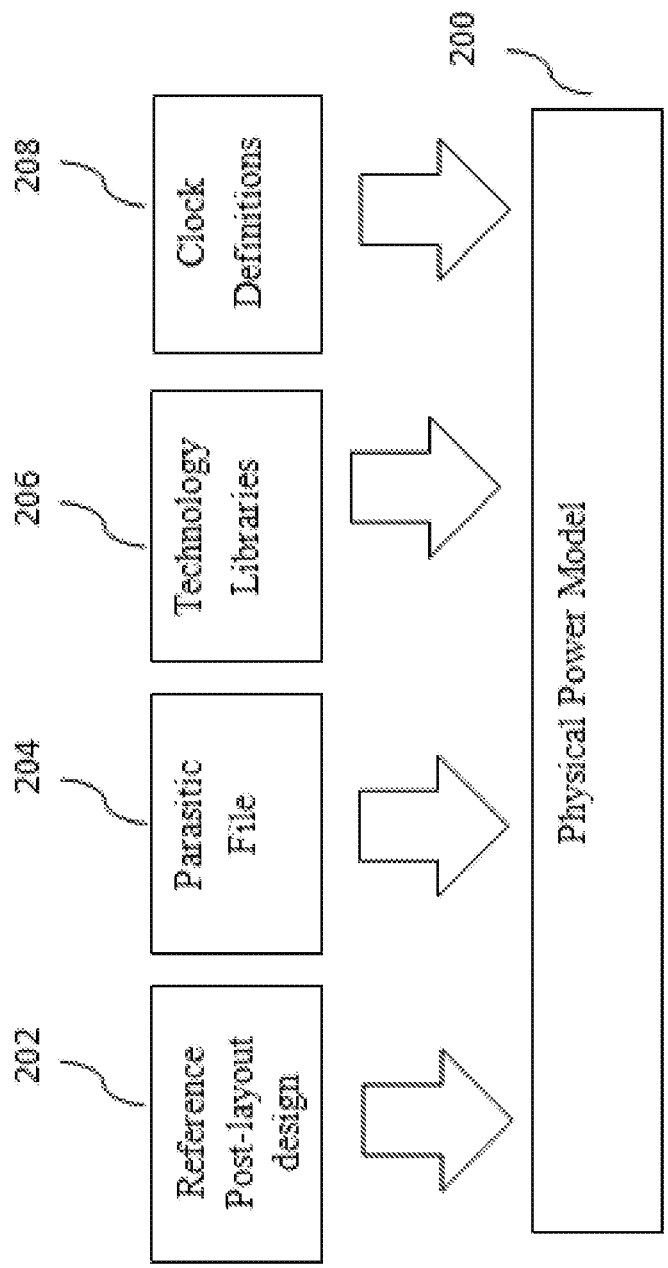
FIG. 3 depicts an example diagram showing a characterization process to generate physical power models.

FIG. 3 depicts an example diagram showing a characterization process to generate physical power models. As shown in FIG. 3, a post-layout reference design 202, a parasitic data file 204, a set of technology liberty libraries 206, and/or a clock definition file 208 are provided for generating one or more physical power models 200. For example, the parasitic data file 204 (SPEF) contains capacitance data of certain wires of the reference design. The set of technology liberty libraries 206 (.LIB) contain cells instantiated in the reference design. In addition, the clock definition file 208 (SDC) defines one or more clock sources and related periods. The characterization process involves building one or more frequency-dependent clock models (e.g., the physical power models 200) by tracing a network of clocks from one or more clock sources to certain sink pins.

In some embodiments, the one or more clock models store topological data as well as electrical characteristics data of clock trees, e.g., minimum, average and/or maximum depth data from the clock sources to the sinks, clock gating style, transition time constraints on inputs and outputs of gates, fan-out and capacitance constraints on the outputs of the gates, area constraints, leakage power constraints, internal energy constraints, etc. The clock models also store one or more cell distribution models. One or more wire capacitance models based on frequencies and locations of clock nets in the clock tree are also characterized and stored in the one or more clock models.

One or more frequency-based maximum-capacitance models are stored in the one or more clock models. In some embodiments, the frequency based maximum-capacitance models are used at RTL for modeling a clock tree to constrain the driving capacity of one or more clock nets (e.g., clock cells) based on a particular clock frequency. For example, a buffer that can drive a load at a particular frequency of the clock signal can drive half the load at twice the frequency.

Figure 4:
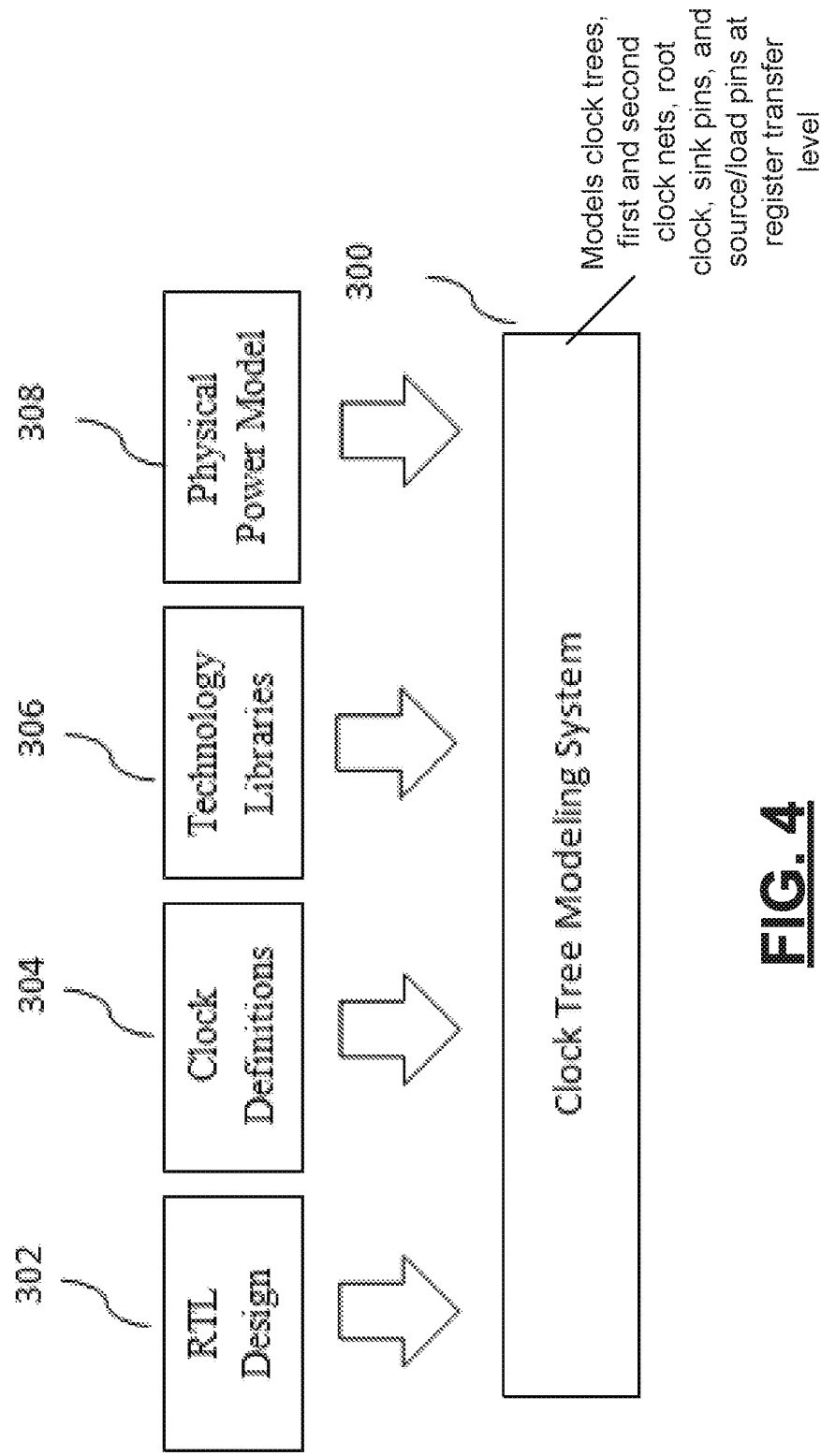
FIG. 4 depicts an example diagram showing application of physical models for RTL clock tree modeling.

In specific embodiments, the clock tree power estimation system 104 applies the one or more physical power models 200 for clock tree modeling for an RTL design. FIG. 4 depicts an example diagram showing application of physical models for RTL clock tree modeling. As shown in FIG. 4, an RTL design 302 (e.g., of a same technology node), a clock definition file 304, a set of technology liberty libraries 306, and one or more physical power models 308 are provided to a clock tree modeling system 300 (e.g., part of the clock tree power estimation system 104) for clock tree modeling. For example, the clock definition file 304 (SDC) defines one or more clock sources and related periods. The set of technology liberty libraries 306 (.LIB) contain clock-gates, clock buffer/invertors, flip-flops, latches, memory cells, etc. The one or more physical power models 308 are the same as the physical power models 200.

Figure 5:
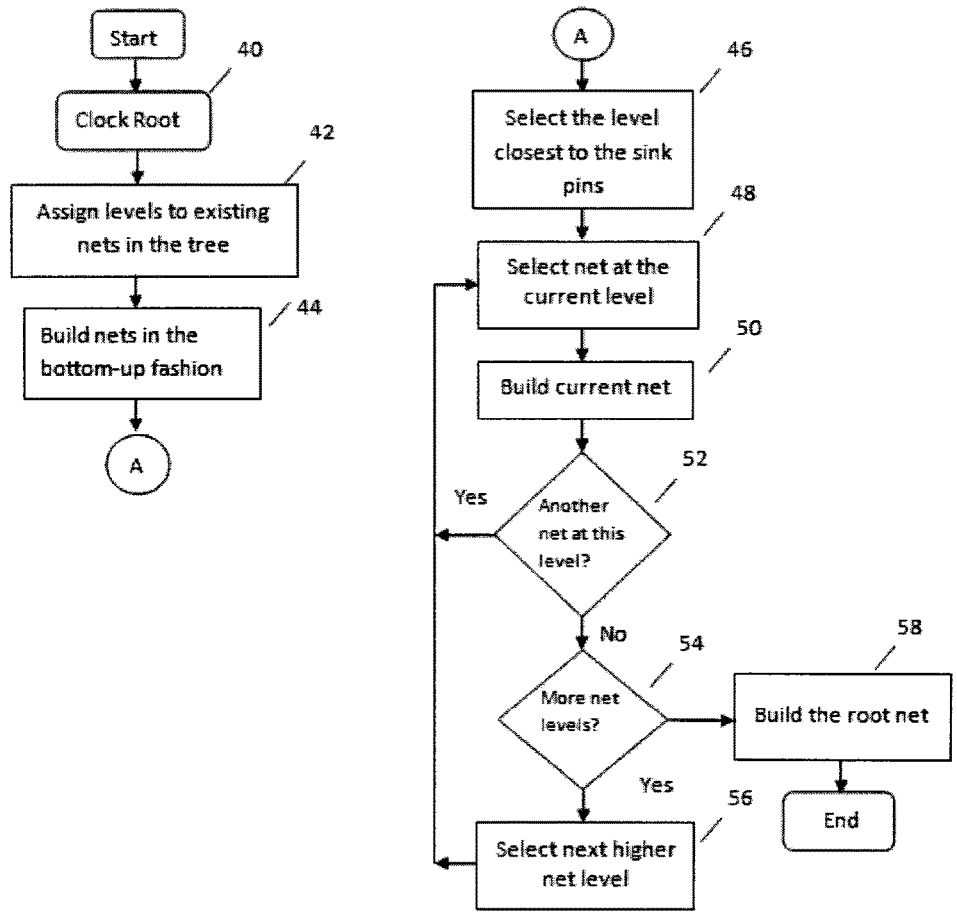
FIG. 5 depicts an example diagram for clock tree synthesis using a bottom-up approach.

FIG. 5 depicts an example diagram for clock tree synthesis using a bottom-up approach. In some embodiments, there can be existing instances and nets in one or more clock paths from a clock root to one or more sink pins. For example, the existing instances and nets correspond to high-level clock gates and clock selectors. The clock tree modeling system 300 is configured to balance the one or more clock paths.

As shown in FIG. 5, at 40, a clock root is determined, and a clock tree related to the clock root is traced. At 42, various logic levels are assigned to one or more instances in the clock tree and the related output nets in an increasing order starting from the clock root. At 44, the assigned nets are then built in a bottom-up fashion starting with one or more nets that are closest to one or more sink pins.

Figure 6:
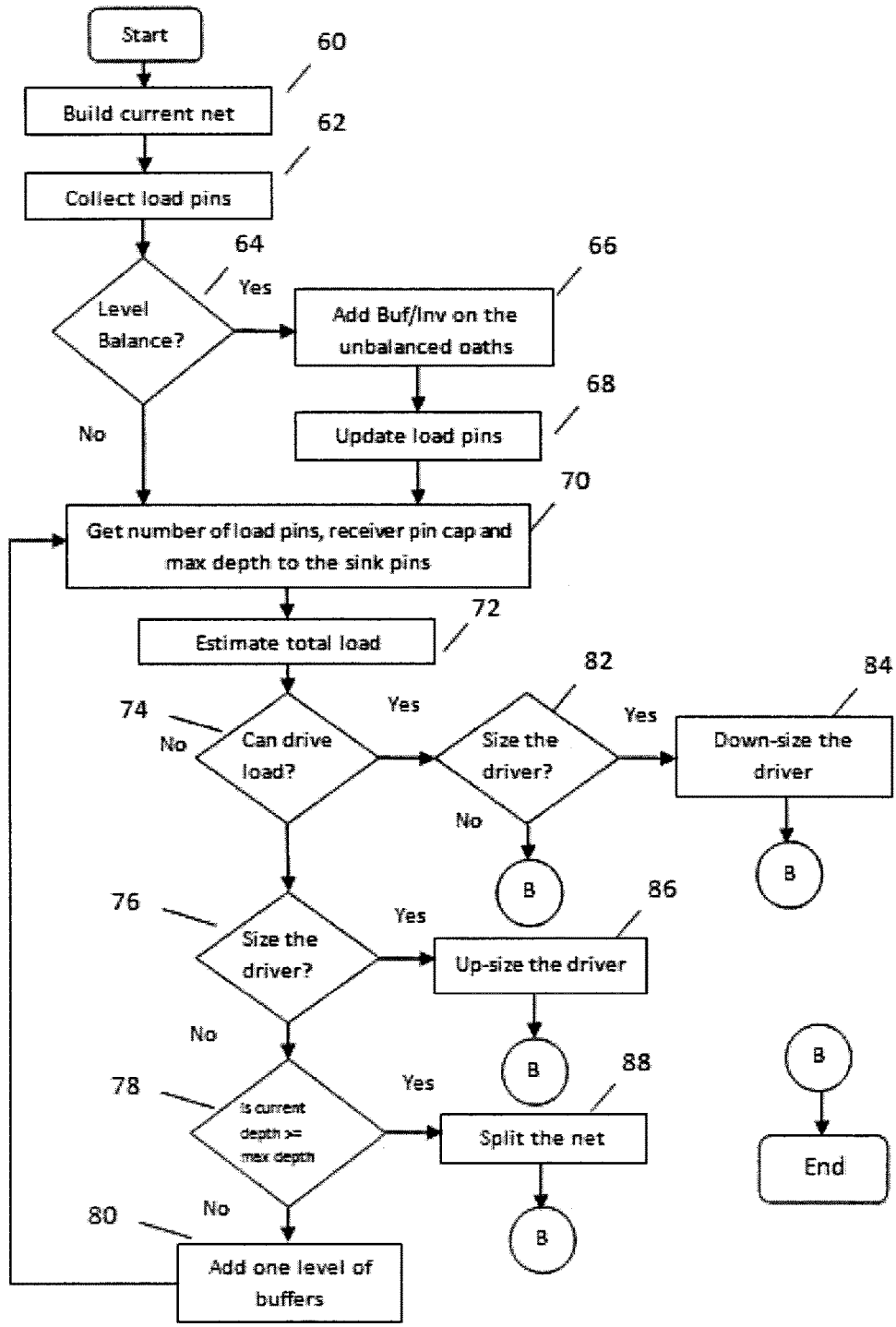
FIG. 6 depicts an example diagram for a clock net building process.

Specifically, at 46, a level closest to the one or more sink pins is selected as a current level. At 48, a clock net (e.g., one or more clock cells) at the current level is selected as a current net. At 50, the current clock net is built (e.g., as shown in FIG. 6). At 52, it is determined if there is any other net at the current level. If there is another net at the current level, that particular net is selected (e.g., at 48) and built (e.g., at 50).

At 54, it is determined if there are any other levels. If there are other net levels, a next higher level is selected (e.g., at 56) and a net associated with the next higher level is selected (e.g., at 48) and built (e.g., at 50). At 58, a root net of the clock root is built if all other net levels have already been processed.

FIG. 6 depicts an example diagram for a clock net building process. At 60, a clock net building process (e.g., corresponding to the net building process 50 as shown in FIG. 5) starts. At 62, one or more receiver pins on the current net are collected. In some embodiments, the receiver pins can be flip-flops, latches, memories, clock-gates, clock buffers, inverters, etc. For example, flip-flops, latches and memories can be at level 0 (i.e., leaf levels) of the clock tree, and other loads (such as clock-gates, clock-buffers, clock-inverters, etc.) can be at non-leaf levels. The logic levels of the receiver pins can be balanced so that a clock is distributed evenly through various clock paths from the current net to all of the receiver pins.

Figure 8:
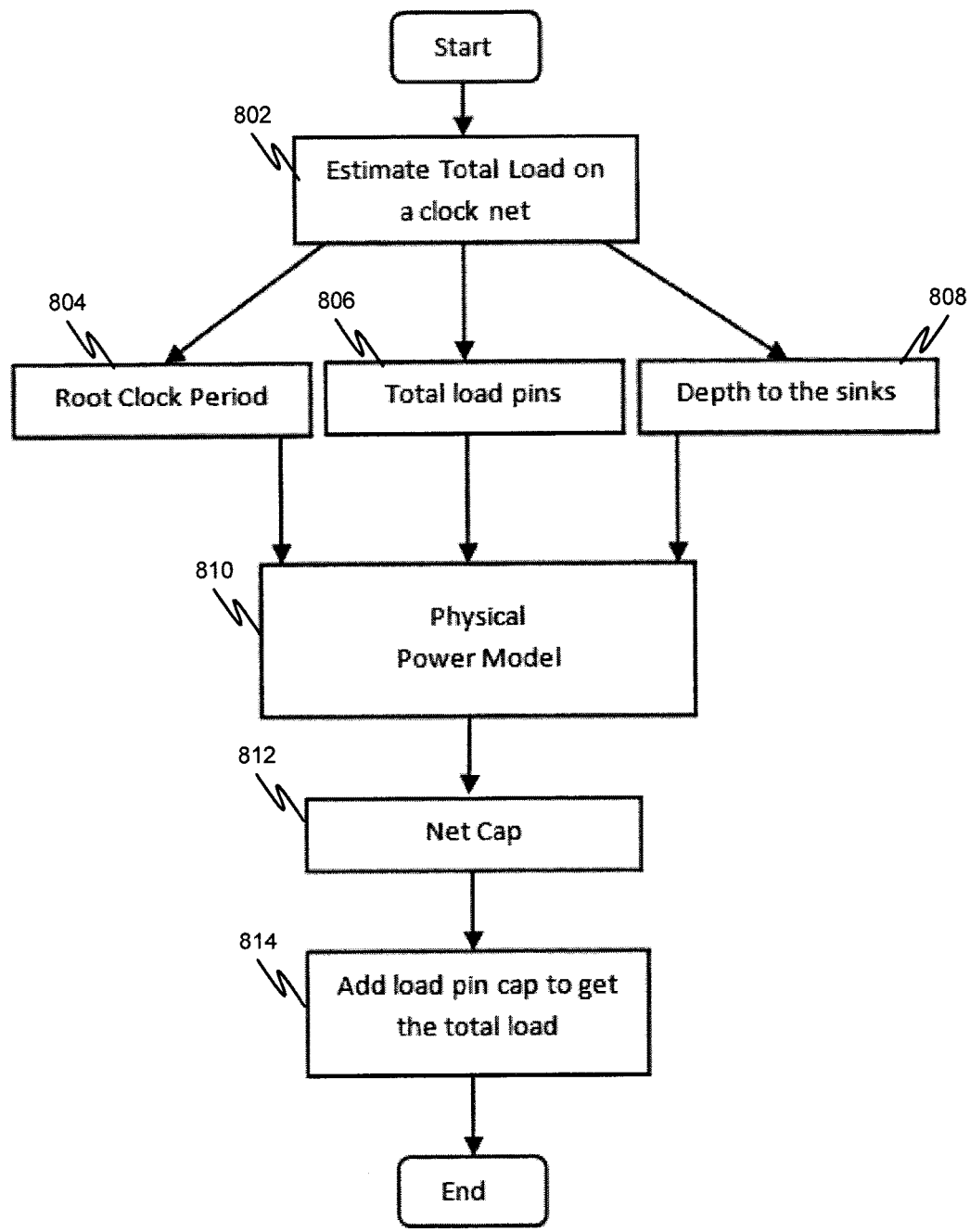
FIG. 8 depicts an example diagram for estimating a total load of a clock net using one or more physical power models.
Figure 9:
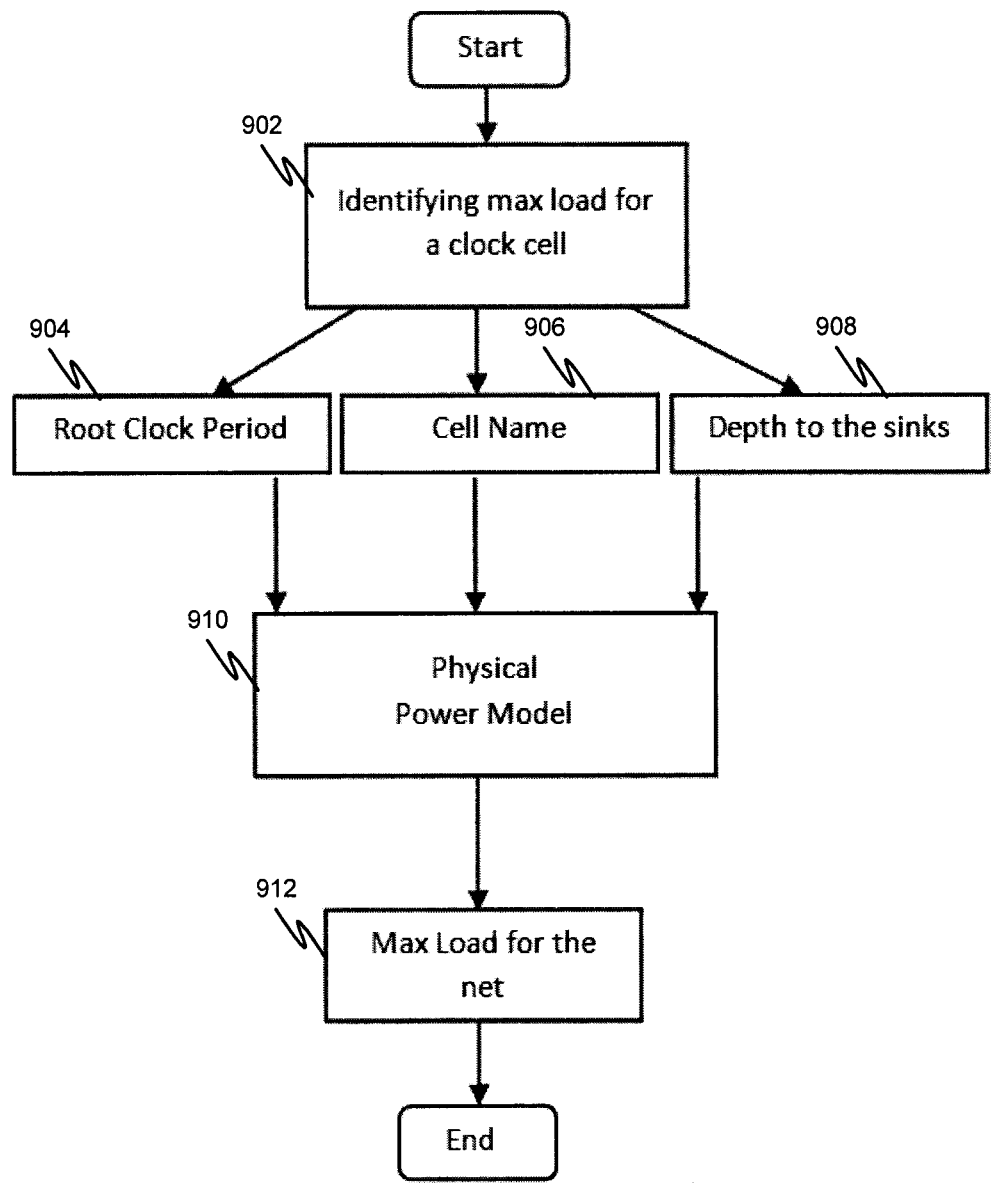
FIG. 9 depicts an example diagram for determining a maximum load constraint for a clock net.

In certain embodiments, the clock tree power estimation system 104 provides logic level balancing as an option. For example, at 64, it is determined if logic level balancing is allowed. At 66, clock buffers/clock inverters are added on one or more unbalanced paths if the logic level balancing is allowed. At 68, one or more load pins are updated once the logic level balancing is done. At 70, the number of receiver pins, the related total pin capacitance and/or the maximum depths to one or more sinks are estimated. At 72, a total load (e.g., a total wire capacitance) is estimated using an interconnect model provided by one or more physical power models (e.g., the physical power models 308). For example, the total load estimation is performed based on a number of receiver pins, a frequency of the clock signal and a location of the net in the clock tree (e.g., as shown in FIG. 8). In some embodiments, a maximum load the clock net can drive is determined (e.g., as shown in FIG. 9) from one or more maximum capacitance constraints (e.g., provided by the physical power models for a given frequency).

At 74, it is determined if the current net can drive the total load. At 82, it is checked if a driver related to the current net can be downsized once it is determined the current net can drive the total load. At 84, the driver is downsized to save power if downsizing is possible.

At 76, it is checked if the driver of the current net can be upsized once it is determined the current net cannot drive the total load. At 86, the driver of the current net is upsized if upsizing is possible. For example, if a logically equivalent (LEQ) high-drive cell is available for use in the technology libraries (LIB) 306, the driver of the current net is upsized using the LEQ high-drive cell.

At 78, when the driver of the current net cannot be upsized, it is determined if a current depth in the clock tree is greater than or equal to a maximum clock depth constraint. For example, the maximum clock depth constraint for a specific clock frequency is modeled in the physical power models 308. In another example, the maximum clock depth constraint for a specific clock frequency is provided by a user. At 88, the current clock net and the driver instance are split based at least in part on a maximum capacitance constraint and a maximum slew constraint from the one or more physical power models 308.

At 80, one level of clock buffers (or inverters) is added to drive current fan-outs if the current depth in the clock tree is smaller than the maximum clock depth constraint. Then, the number of receiver pins, the related total pin capacitance and/or the maximum depths to one or more sinks are estimated again (e.g., at 70) to carry out another iteration of the process.

Figure 7:
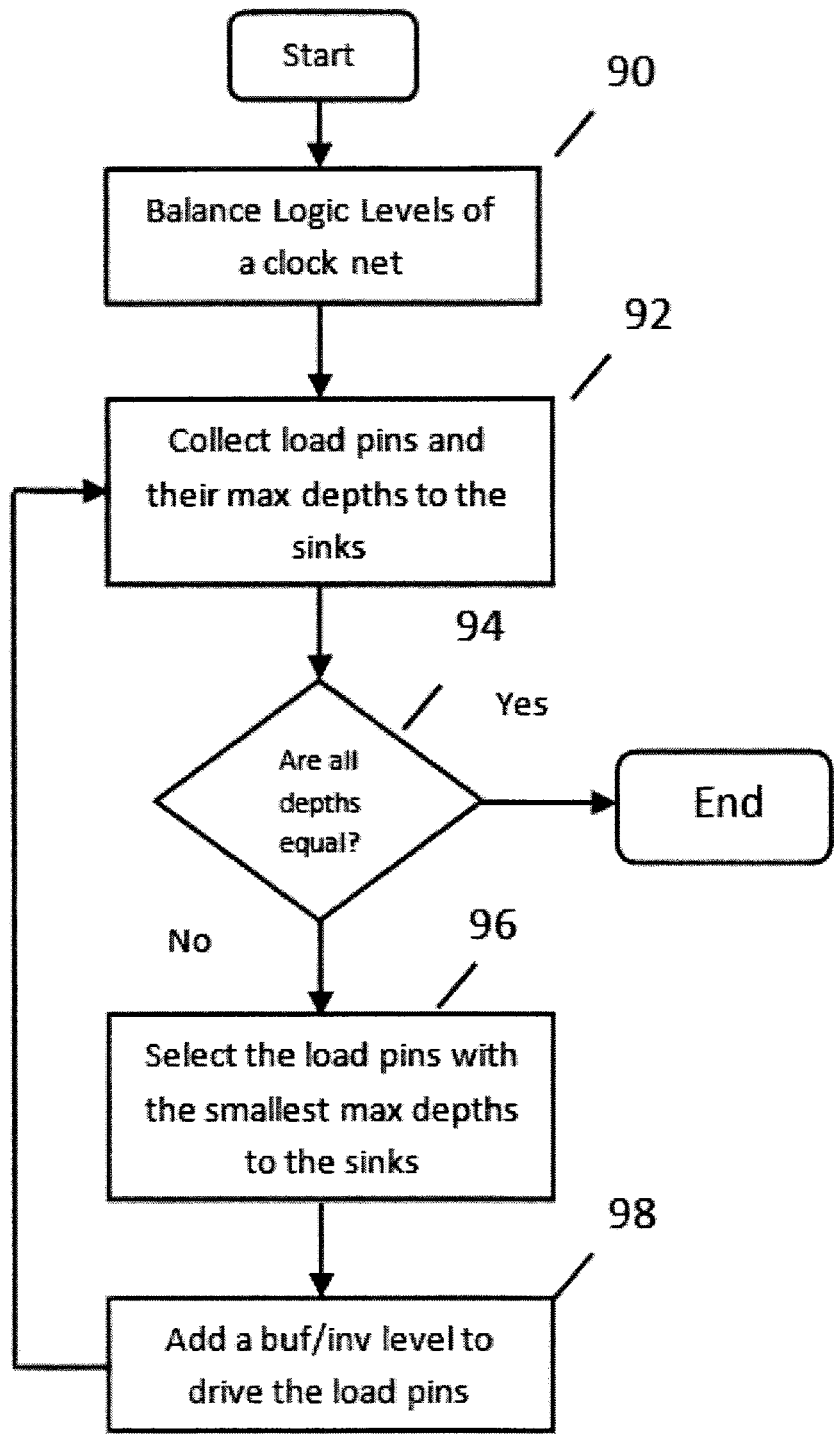
FIG. 7 depicts an example diagram for logic level balancing of a clock net.

FIG. 7 depicts an example diagram for logic level balancing of a clock net. At 90, the process for logic level balancing on fan-outs of a clock net (e.g., corresponding to the processes 66 and 68 as shown in FIG. 6) begins. At 92, one or more load pins and related maximum depths from the load pins to one or more clock sinks are collected. At 94, it is determined if the maximum depths of the load pins are all the same. If the maximum depths are all the same, the process for logic level balancing ends. At 96, a smallest maximum depth value is determined if the maximum depths of the load pins are not all the same, and one or more load pins associated with the smallest maximum depth value are selected and/or grouped. At 98, then a buffer level (or an inverter level) is added to drive fan-outs of the selected/grouped load pins.

FIG. 8 depicts an example diagram for estimating a total load of a clock net using one or more physical power models. At 802, the process for estimating the total load of a clock net (e.g., corresponding to the process 72 as shown in FIG. 6) begins. At 804, a root clock period is obtained. At 806, a number of total load pins (e.g., fan-outs) are obtained. At 808, topology information, such as depths to one or more sinks, is obtained. At 810, one or more physical power models (e.g., the physical power models 308) are provided. At 812, a net capacitance is estimated based on the one or more physical power models (e.g., using the root clock period, the total load pins, the depths to the sinks, etc.). At 814, one or more load pin capacitances are added to obtain the total load.

FIG. 9 depicts an example diagram for determining a maximum load constraint for a clock net. At 902, a process for identifying a maximum load constraint for a clock cell begins. At 904, a root clock period is obtained. At 906, a cell name for the clock cell is obtained. At 908, depths to one or more skins are obtained. At 910, one or more physical power models (e.g., the physical power models 308) are provided. At 912, the maximum load constraint for the current clock net (i.e., a maximum load the clock net can drive) is determined based on the one or more physical power models (e.g., using the root clock period, the cell name, the depths to the sinks, etc.).

Figure 10:
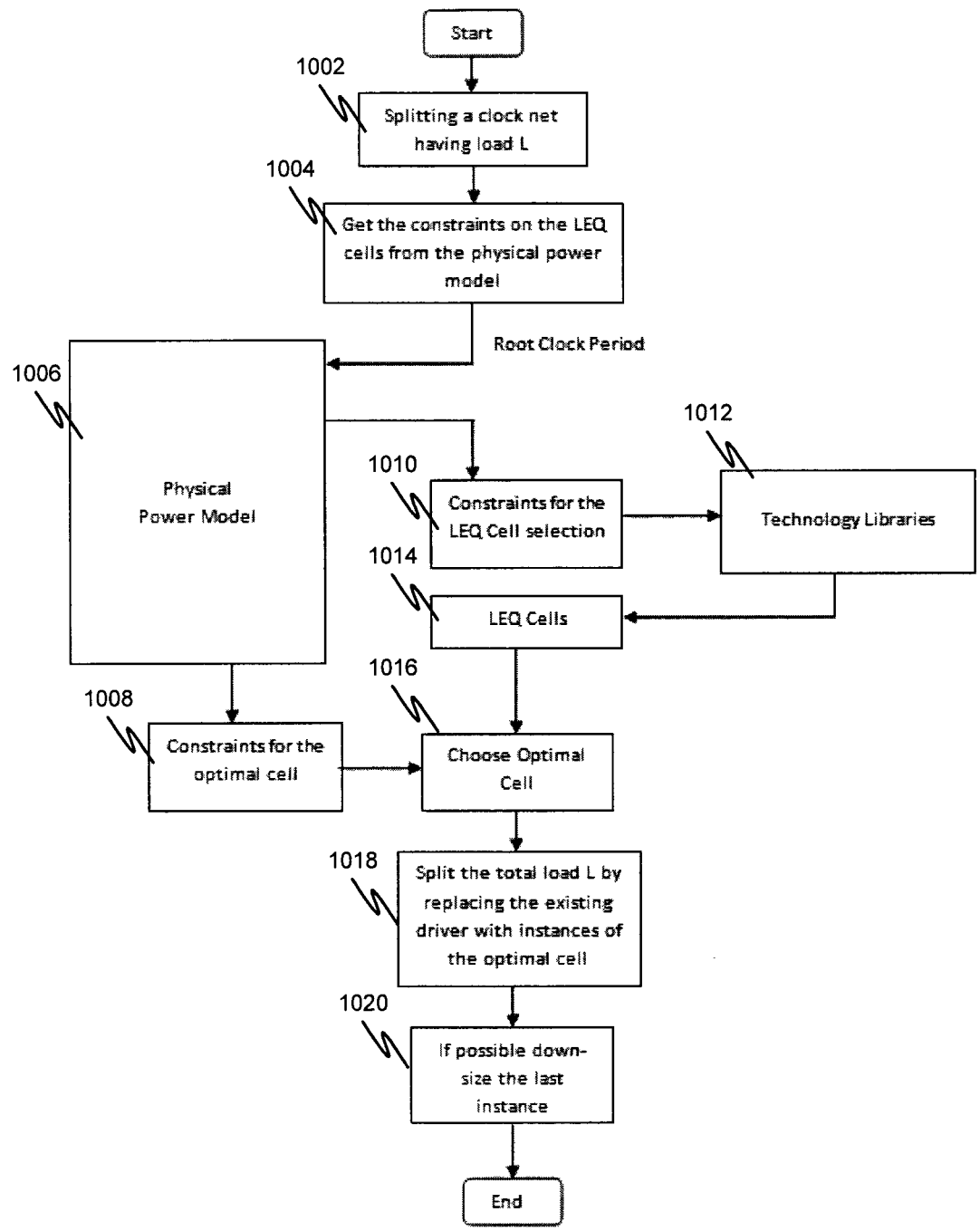
FIG. 10 depicts an example diagram for splitting a clock net.

FIG. 10 depicts an example diagram for splitting a clock net. At 1002, the process for splitting a clock net (e.g., corresponding to the process 88 as shown in FIG. 6) begins. For example, the clock net has a load L. At 1004, a process for obtaining constraints on one or more LEQ cells from one or more physical power models (e.g., the physical power models 308) is performed. Specifically, at 1006, the physical power models are provided. At 1008, one or more constraints for an optimal cell are obtained based on the physical power models. For example, the constraints for the optimal cell are obtained based on minimum/average/maximum models for capacitance, slew, leakage, area, internal energy, and/or depths from one or more sinks. At 1010, one or more constraints for LEQ cell selection are obtained based on the physical power models. At 1012, one or more technology libraries (e.g., the technology libraries 306) are provided. At 1014, one or more LEQ cells are identified from the technology libraries (e.g., the technology libraries 306).

At 1016, the one or more constraints for the optimal cell are applied to choose an optimal cell from the one or more LEQ cells. At 1018, the total load L of the clock net is split by replacing the existing driver with instances of the optimal cell. At 1020, the last instance is downsized (e.g., to save power) if possible. In some embodiments, the clock tree power estimation system 104 splits the clock net to reduce clock insertion delay and improve timing. For example, the clock tree power estimation system 104 performs the splitting when a delay on a clock path (e.g., constrained by a maximum clock depth from the physical power models) cannot be increased.

In certain embodiments, the systems and methods described herein are configured to model a clock tree at RTL using a physical power model generated from a reference post-CTS design, estimate power of the modeled clock tree, and establish correlation with the post-CTS design (e.g., correlation within 10% of the post-CTS design).

Figure 11:
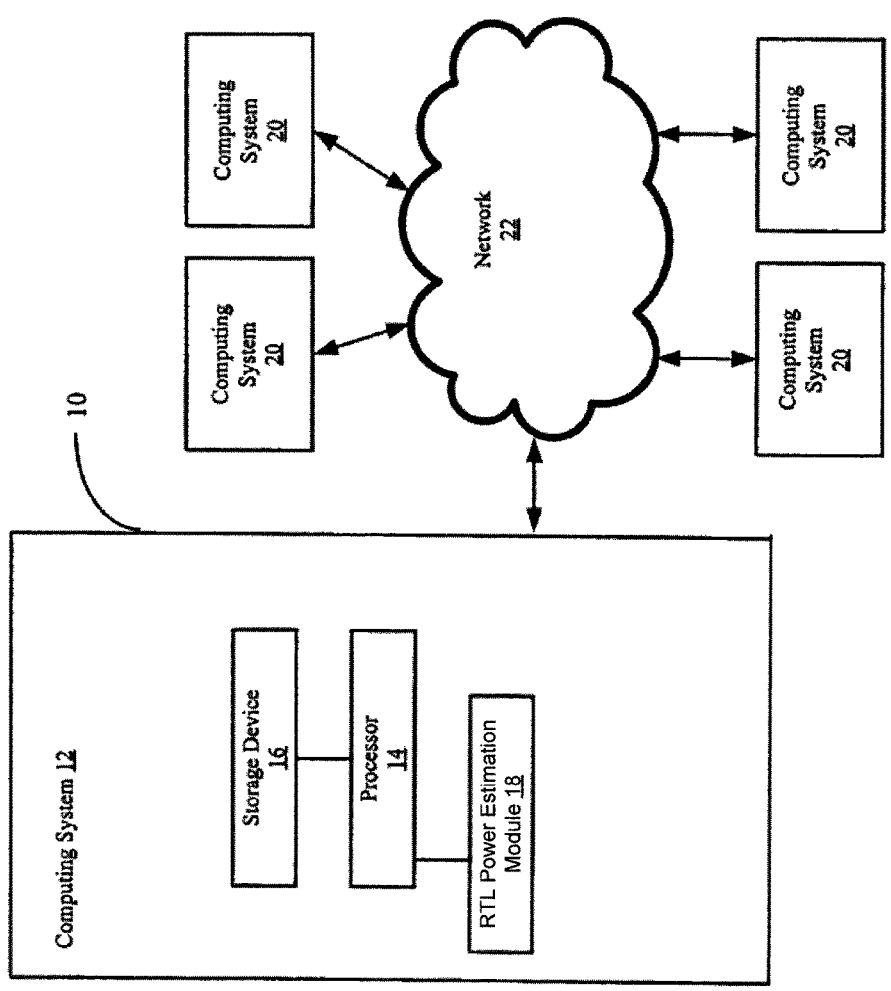
FIG. 11 depicts an example diagram showing a system for clock tree power estimation.

FIG. 11 depicts an example diagram showing a system for clock tree power estimation. As shown in FIG. 11, the system 10 includes a computing system 12 which contains a processor 14, a storage device 16 and a clock tree power estimation module 18. The computing system 12 includes any suitable type of computing device (e.g., a server, a desktop, a laptop, a tablet, a mobile phone, etc.) that includes the processor 14 or provide access to a processor via a network or as part of a cloud based application. The clock tree power estimation module 18 includes tasks (e.g., as shown in FIG. 5) and is implemented as part of a user interface module (not shown in FIG. 11).

Figure 12:
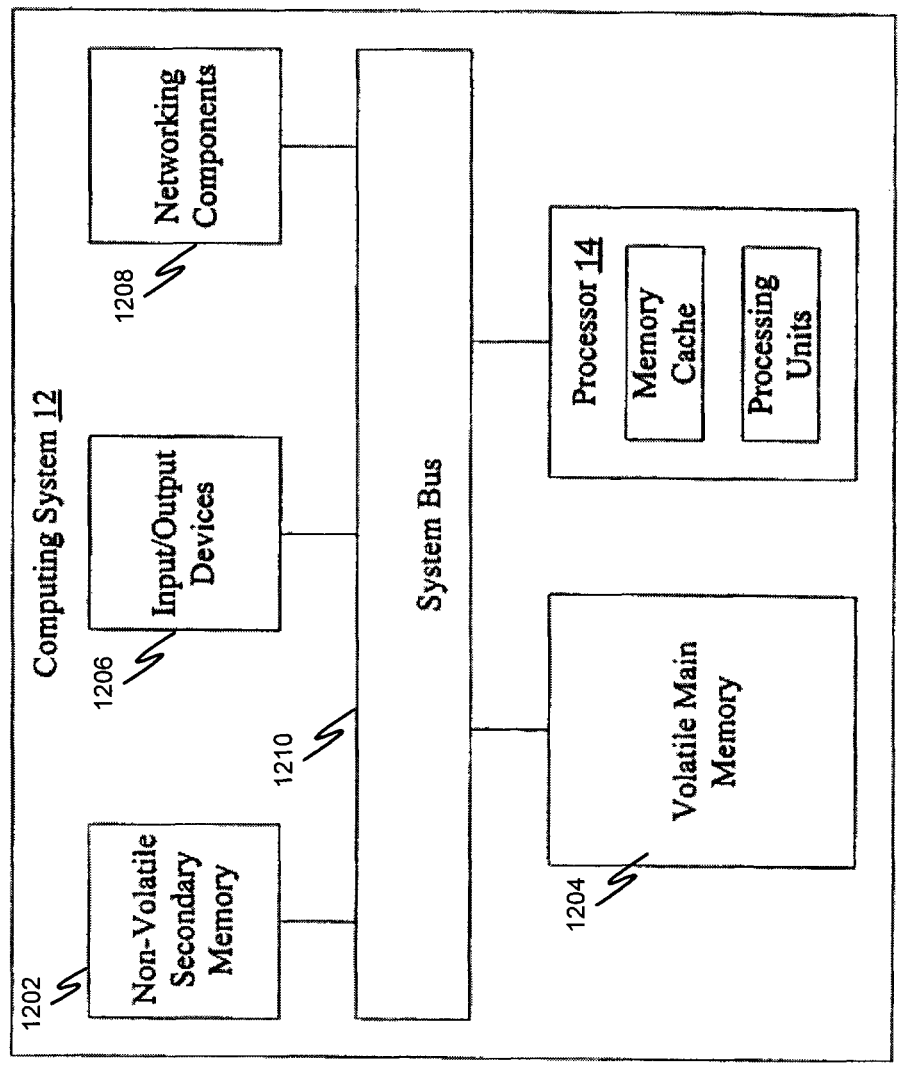
FIG. 12 depicts an example diagram showing a computing system for clock tree power estimation.

FIG. 12 depicts an example diagram showing a computing system for clock tree power estimation. As shown in FIG. 12, the computing system 12 includes a processor 14, memory devices 1202 and 1204, one or more input/output devices 1206, one or more networking components 1208, and a system bus 1210. In some embodiments, the computing system 12 includes the clock tree power estimation module 18, and provides access to the clock tree power estimation module 18 to a user as a stand-alone computer.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The invention claimed is:

1. A method for clock tree power estimation at register transfer level implemented in a programmable computing system, the computing system having at least one processing unit and a memory accessible by the processing unit, the memory storing a hardware description of at least a portion of the integrated circuit design, the memory also storing a set of program instructions that when executed by the processing unit causes the computing system to perform steps comprising:

generating a physical effects model based on a previously generated physical layout design;

modeling a clock tree at register transfer level based on the physical effects model by building clock nets of the clock tree using a bottom-up approach, wherein building the clock net includes:

performing logic level balancing on one or more fan-out paths estimating a total load using the physical effects model performing driver resizing for driving the total load; and performing clock net splitting or adding one or more levels of buffers to balance the total load; and performing power estimation for the modeled clock tree at the register transfer level;

manufacturing an integrated circuit based on the clock tree.

2. The method of claim 1, wherein generating a physical effects model based on the reference post-layout design comprises:

obtaining a previous version of the reference post-layout design;

obtaining a parasitic file;

obtaining one or more technology libraries;

obtaining a clock definition file; and generating the physical effects model based on the previous version of the reference post-layout design, the parasitic file, the one or more technology libraries, and the clock definition file.

3. The method of claim 2, wherein obtaining the parasitic file comprises:

building a wire capacitance model based on a clock frequency and one or more locations of one or more clock nets in the clock tree.

4. The method of claim 3, wherein obtaining the parasitic file further comprises:

building one or more frequency-based maximum-capacitance models for the clock nets.

5. The method of claim 1, wherein generating the physical effects model based on the reference post-layout design comprises:

obtaining a second design of a similar style as the reference post-layout design at a technology node;

obtaining a parasitic file;

obtaining one or more technology libraries;

obtaining a clock definition file; and generating the physical effects model based on the second design, the parasitic file, the one or more technology libraries, and the clock definition file.

6. The method of claim 5, wherein obtaining the parasitic file comprises:

building a wire capacitance model based on a clock frequency and one or more locations of one or more clock nets in the clock tree.

7. The method of claim 6, wherein obtaining the parasitic file further comprises:

building one or more frequency-based maximum-capacitance models for the clock nets.

8. The method of claim 1, wherein generating the physical effects model based on the reference post-layout design comprises:

characterizing one or more frequency dependent clock models by tracing networks of one or more defined clock signals from a source to one or more sink pins.

9. The method of claim 8, further comprising:

storing topological information and electrical characteristics of the clock tree; and building a cell distribution model based on the topological information and the electrical characteristics of the clock tree.

10. The method of claim 9, wherein the topological information and the electrical characteristics include a minimum depth from a clock source to one or more sinks, an average depth from the clock source to the one or more sinks, a maximum depth from a clock source to the one or more sinks, a clock gating style, one or more transition time constraints on inputs of one or more gates, one or more transition time constraints on outputs of the one or more gates, one or more fan-out constraints on the outputs of the one or more gates, one or more capacitance constraints on the outputs of the one or more gates, one or more area constraints, one or more leakage power constraints, or one or more internal energy constraints.

11. The method of claim 1, wherein building the clock nets of the clock tree using the bottom-up approach comprises:

building one or more first clock nets closest to one or more sink pins; and building one or more second clock nets near the first clock nets.

12. The method of claim 1, wherein building the clock nets of the clock tree using the bottom-up approach further comprises:

constraining one or more clock buffers or one or more inverters using one or more maximum capacitance models.

13. The method of claim 1, wherein performing logic level balancing on one or more fan-out paths comprises:

collecting one or more first load pins and one or more maximum depths from the one or more first load pins to one or more sink pins;

selecting a smallest maximum depth;

determining one or more second load pins associated with the smallest maximum depth, the second load pins being included in the first load pins; and adding a buffer level or an inverter level to drive fan-outs of the second load pins.

14. The method of claim 13, wherein performing logic level balancing on one or more fan-out paths further comprises:

repeating the collecting, selecting, determining and adding steps until the maximum depths associated with the first load pins become equal.

15. The method of claim 1, wherein estimating the total load using the physical effects model comprises:

using a root clock period, a total number of load pins and one or more depths to one or more sinks to estimate the total load.

16. The method of claim 12, wherein constraining the one or more clock buffers or the one or more inverters using the maximum capacitance models comprises:

building one or more frequency-dependent maximum-capacitance models for the clock nets;

wherein a maximum capacitance corresponds to a maximum load for a clock net to drive at a specific frequency.

17. The method of claim 1, wherein performing driver resizing for driving the total load comprises:

determining if the one or more clock nets can drive the total load;

if the one or more clock nets can drive the total load, downsizing the driver; and if the one or more clock nets cannot drive the total load, upsizing the driver.

18. The method of claim 1, wherein performing clock net splitting to balance the total load comprises:
  determining if a number of existing levels in the clock tree has reached a maximum level constraint from the physical effects model; and
  if the number of existing levels in the clock tree has reached the maximum level constraint, splitting the one or more clock nets based on an optimal logically equivalent cell;
  wherein the optima logically equivalent cell is determined based on one or more electrical constraints from the physical effects model.

19. A processor-implemented system for clock tree power estimation at register transfer level, the system comprising:
  one or more data processors; and
  one or more non-transitory computer-readable storage media encoded with instructions for commanding the one or more data processors to execute operations including:
    generating a physical effects model based on a previously generated physical layout design;
    modeling a clock tree at register transfer level based on the physical effects model by building clock nets of the clock tree using a bottom-up approach, wherein building the clock nets includes:
      performing logic level balancing on one or more fan-out paths
      estimating a total load using the physical effects model
      performing driver resizing for driving the total load; and
      performing clock net splitting or adding one or more levels of buffers to balance the total load; and
    performing power estimation for the modeled clock tree at the register transfer level;
    manufacturing an integrated circuit based on the clock tree.

20. A non-transitory machine-readable storage medium encoded with instructions for commanding one or more data processors to execute operations of a method for clock tree power estimation at register transfer level, the method comprising:
  generating a physical effects model based on a previously generated physical layout design;
  modeling a clock tree at register transfer level based on the physical effects model by building clock nets of the clock tree using a bottom-up approach, wherein building the clock netw includes:
    performing logic level balancing on one or more fan-out paths
    estimating a total load using the physical effects model
    performing driver resizing for driving the total load; and
    performing clock net splitting or adding one or more levels of buffers to balance the total load; and
  performing power estimation for the modeled clock tree at the register transfer level;
  manufacturing an integrated circuit based on the clock tree.

* * * * *